L. DE LACEE.
Hay Loader.

No. 45,394.

2 Sheets—Sheet 1.

Patented Dec. 13, 1864.

Attest:

Inventor:

L. DE LACEE.
Hay Loader.

No. 45,394.

2 Sheets—Sheet 2.

Patented Dec. 13, 1864.

Attest
B. L. Topliff
Henry Morris

Inventor
Leopold DeLace
per Munn &Co
attorney

UNITED STATES PATENT OFFICE.

LEOPOLD DE LACÉE, OF NEWARK, NEW YORK.

IMPROVEMENT IN MACHINES FOR LOADING HAY.

Specification forming part of Letters Patent No. 45,394, dated December 13, 1864.

*To all whom it may concern:*

Be it known that I, LEOPOLD DE LACÉE, of Newark, in the county of Wayne and State of New York, have invented a new and Improved Machine for Loading Hay and Grain; and I do hereby declare that the following is a full, clear, and exact description thereof, which will enable others skilled in the art to make and use the same, reference being had to the accompanying drawings, forming part of this specification, in which—

Figure 1:
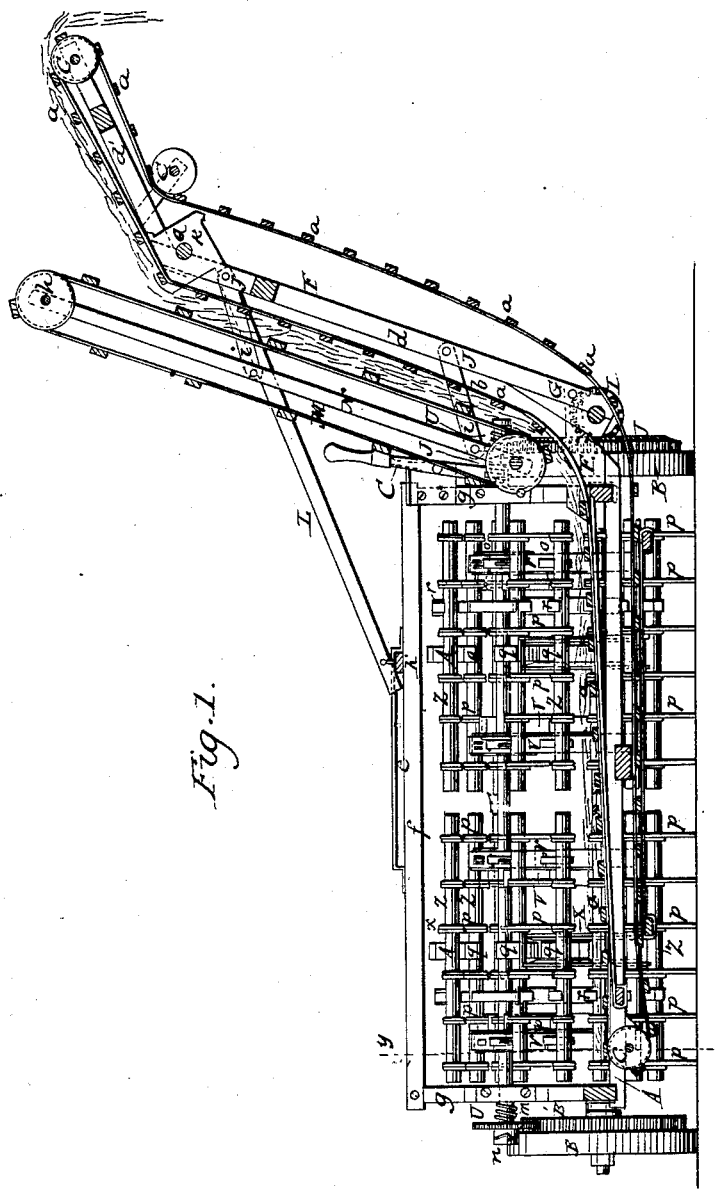
Figure 2:
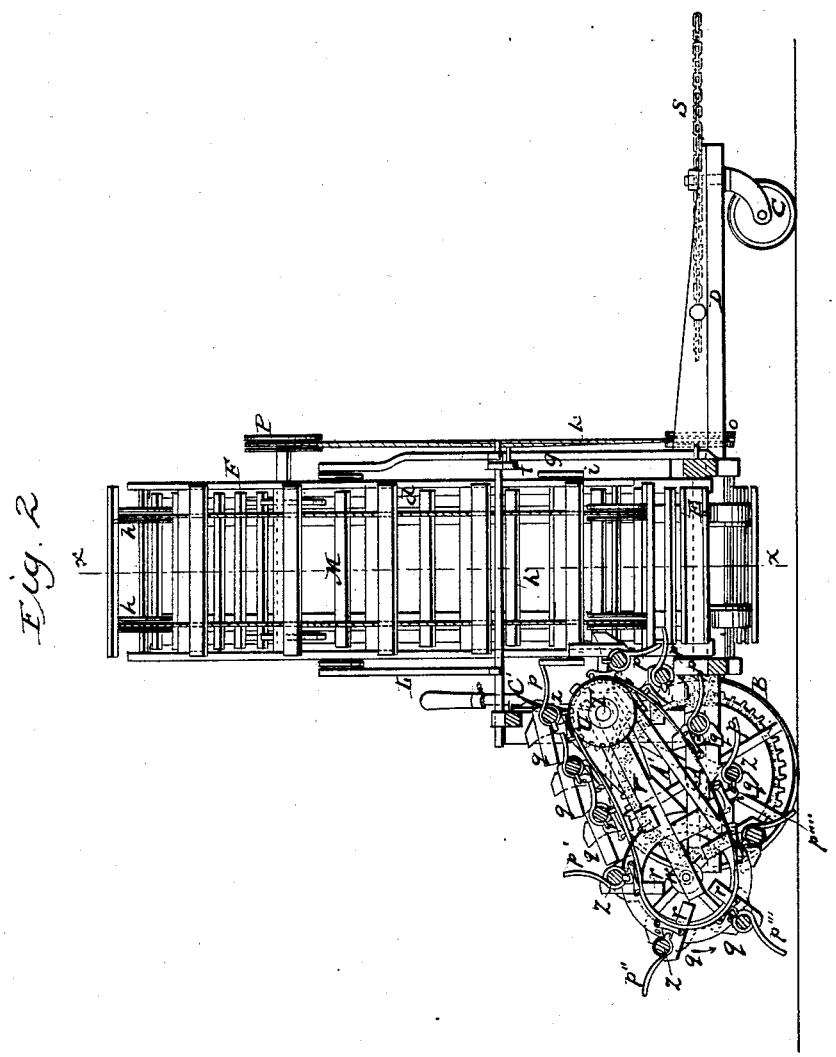

Figure 1, Sheet No. 1, is a front sectional view of my invention, taken in the line $x\ x$, Fig. 2, Sheet No. 2. Fig. 2, Sheet 2, is a side sectional view of the same, taken in the line $y\ y$, Fig. 1, Sheet No. 1.

Similar letters of reference indicate like parts.

This invention relates to a new and improved machine for raking up hay or grain from the field after being dried or cured, where cut and left by the harvester, and depositing the same on the cart or wagon.

The invention is designed to obviate as far as possible manual labor in the harvesting of grass and grain by enabling one or two hands to keep pace with the mowing-machine or reaper—that is to say, to gather or take in in a given time as much hay or grain as a grass or grain harvester can cut.

At present farmers experience much difficulty in harvesting grass and grain cut by a harvester. The latter does its work so rapidly, cutting about one acre per hour, that a large force of men is required to take in the crop, and when labor is scarce great risk is incurred, the grass or grain on account of long exposure to the weather being frequently damaged by rain or by being burned by the sun. Besides the advantage of rapidity in gathering the crop, my invention possesses that of economy, dispensing with hand or machine raking, binding, &c.

A represents the frame of the machine, which is mounted on three wheels, B B C, the wheels B B being at the rear of the frame, one at each side, and the wheel C being at the front end of the draft-pole D, the former being a caster-wheel. (See Fig. 2.)

E represents an endless carrier, composed of a series of slats, $a$, which may be of wood, attached near their ends to endless bands $b\ b$, which may be of leather or other suitable flexible material. This carrier E works over suitable rollers or pulleys, $c$, placed in the frame A, and in an inclined portion, F, attached to it, the portion F being composed of two parts, $d$ $d'$, one, $d$, being slightly inclined from a vertical plane and the other, $d'$, which projects from the upper end of $d$, being slightly inclined from a horizontal plane, as shown clearly in Fig. 1. The part $d'$ of the portion F of the framing is rigidly attached to the part $d$; but the latter is not rigidly attached to A, but is fitted at its lower end on a shaft, G, in A. The lower end of $d$ projects a trifle below the shaft G, and it has a shaft, H, fitted in it, on one end of which a pinion, I, is keyed, the latter, when the machine is at work, gearing into a wheel, J, which is attached to or cast with one of the wheels B concentrically at its outer side. Motion is communicated to the carrier E through the medium of this gearing, and at any time when it is desired that said carrier shall be inoperative the portion F of the framing is moved over toward the center of the machine, and as the part $d$ of F works on the shaft G the pinion I will be thrown out of gear with wheel J. This movement of the part F is effected by means of a sliding bar, K, which is fitted in guides $e$ on horizontal bars $f\ f$, attached to uprights $g$ on the frame A, said bar K being attached to arms L L, which are connected with the portion F of the framing.

M represents what I term a "supplemental carrier," which is constructed in precisely the same way as the carrier E, and works over rollers or pulleys $h$ in a rectangular frame, N, which is attached to the part $d$ of the portion F of the framing by means of parallel bars $i$, the ends of the latter being connected to N and F by pivots $j$. The frame N is directly opposite the part $d$ of F, as shown in Fig. 1, and the carrier M will have a tendency, under the gravity of the frame N, to work in contact with the part of the carrier E which is in front of the part $d$ of the portion F of the framing. If the gravity of the frame N is not sufficient to effect this result, springs or a weight may be used in addition to it.

In order to avoid confusion, I will proceed to describe the operation of the carriers E M. The carrier E, as the machine is drawn along, is moved in the direction indicated by the arrow 1, and the hay or grain is thrown upon the horizontal part of E over the frame A and is carried up between E and the carrier M, the latter holding or clamping the hay or grain, as will be fully understood by referring to Fig. 1, and causing it to reach the part $d'$ of F, over which it passes, and is discharged into the cart or wagon, the part $d'$ being elevated somewhat higher than the load on the cart or wagon is designed to reach.

It has been stated that motion is given the carrier E through the medium of the gearing I J. These, however, are not all. The shaft H has a pulley, O, on its end opposite to that where the pinion I is keyed, and a belt, $k$, passes around said pulley and a pulley, P, on one end of a shaft, Q, in the upper part of $d'$ of F, said shaft Q having two wiper-wheels, R R, upon it, which engage with or catch under the slats $a$ of E, and cause the same to be moved.

The machine is connected to one side of the cart or wagon by means of a chain, S, which is connected to the draft-pole D, a pole or reach extending from the side of the draft-pole to the cart or wagon to keep the machine in proper relative position with the cart or wagon. Any proper means, however, may be employed for connecting the machine with the cart or wagon.

I will now proceed to describe the raking device, or the means by which the hay or grain is raked up and deposited upon the carrier E.

At the back part of the frame A there is fitted in uprights $g$ a horizontal shaft, T, on each end of which there is a pinion, U, placed loosely, and so arranged as to turn backward without communicating motion to shaft T, but when turned forward causing the shaft T to turn with them. This result is attained by means of a spring, $m$, and a clutch, $n$, as shown in Fig. 1. Other means, however, may be employed for the purpose.

On the shaft T there are placed a series of pulleys, U', and two swinging frames, V V, a shaft, W, being in the lower part of each of the latter, each shaft W having a pulley, X, upon it, said pulleys having grooved peripheries.

Around the pulleys U' on the shaft T endless belts or chains Y pass, to which slats or rods Z are attached by joints $o$. These rods Z have short wire teeth $p$ secured to them in the same manner that the wire teeth of horse-rakes are attached to their shaft. These endless belts, rods, and teeth form endless rakes, which are designated by $A^\times$.

At the center of each rod Z there is attached a block or bearing, $q$, which passes or works over the pulleys X, and said blocks or bearings, as they come in contact with and pass around the pulleys X, serve to turn the teeth $p$ in such a position as to enable them to act upon and rake up the hay or grain, (see Fig. 2,) in which the teeth $p'$ $p''$ $p'''$ $p''''$ are in proper position to thus work when they are brought in contact with the grass or grain. Each rod Z has an arm, $r$, extending from it, and these arms as the blocks or bearings $q$ leave the pulleys X, come in contact with inclined bars A' in the frames V V, and pass underneath them, said bars causing the loaded teeth $p$ to be inclined upward sufficiently to enable them to hold or retain their load while being conveyed to the carrier E, the teeth $p$ dropping to discharge their load on the carrier E when the arms $r$ pass from underneath the upper or front ends of the bars A'. (See Fig. 2.) The pinions U U on the shaft T gear, one into the wheel J, which is provided with two sets of teeth—one for the pinion I and the other for the pinion U—the other pinion U gearing into a wheel, B', on the other wheel B. The shaft T is allowed to slide in its bearings, so that the pinions U U may be shoved in and out of gear with the wheels J B' by means of a lever, C'.

I claim as new and desire to secure by Letters Patent—

1. The supplemental endless carrier M, when arranged in the manner substantially as shown and described, so as to be capable of adjusting itself either wholly or partially by its own gravity to operate in connection with the main carrier, as and for the purpose set forth.

2. The endless rakes $A^\times$, in combination with the pulleys X, bearings $q$, and bars A', all arranged, substantially as shown, for the purpose of raking up the hay or grain and depositing it upon the carrier E, as described.

3. The arrangement of the frames A F and carrier-driving gear I J, substantially as herein shown and described, for the purpose of rendering the carriers operative and inoperative when desired.

4. The combination of the endless carriers E M, endless rakes $A^\times$, mounted on wheels, and all constructed and arranged to operate, when attached to a cart or wagon, substantially as and for the purpose herein set forth.

LEOPOLD DE LACÉE.

Witnesses:
J. P. HALL,
THEO. TUSCH.